United States Patent
Cauchois et al.

(10) Patent No.: US 11,040,501 B2
(45) Date of Patent: Jun. 22, 2021

(54) MOLDING DEVICE FOR THE MANUFACTURE OF COMPOSITE COMPONENTS USING LIQUID POLYMER RESIN

(71) Applicants: Arkema France, Colombes (FR); INSTITUT DE SOUDURE, Villepinte (FR)

(72) Inventors: Jean-Pierre Cauchois, Obersteinbach (FR); Pierre Gerard, Denguin (FR); Gilles Francois, Porcelette (FR); Sébastien Taillemite, Chaville (FR); Henri Perrin, Brehain (FR)

(73) Assignee: Arkema France, Colombes (FR)

(*) Notice: Subject to any disclaimer, the term of this patent is extended or adjusted under 35 U.S.C. 154(b) by 426 days.

(21) Appl. No.: 15/532,730

(22) PCT Filed: Dec. 3, 2015

(86) PCT No.: PCT/FR2015/053309
§ 371 (c)(1),
(2) Date: Jun. 2, 2017

(87) PCT Pub. No.: WO2016/087788
PCT Pub. Date: Jun. 9, 2016

(65) Prior Publication Data
US 2017/0355154 A1    Dec. 14, 2017

(30) Foreign Application Priority Data

Dec. 3, 2014 (FR) ...................................... 14 61865

(51) Int. Cl.
*B29C 70/48* (2006.01)
*B29C 70/46* (2006.01)
(Continued)

(52) U.S. Cl.
CPC ........ *B29C 70/467* (2013.01); *B29C 33/0061* (2013.01); *B29C 33/10* (2013.01);
(Continued)

(58) Field of Classification Search
None
See application file for complete search history.

(56) References Cited

U.S. PATENT DOCUMENTS 3,028,284 A * 4/1962 Reeves ................ B29C 70/467
                                                                      264/257
4,810,444 A    3/1989 Alberino et al.
(Continued)

FOREIGN PATENT DOCUMENTS

DE    102013102044    9/2014
EP       0792903      9/1997
WO    WO 2014173671   10/2014

*Primary Examiner* — Monica A Huson
(74) *Attorney, Agent, or Firm* — Thomas F. Roland

(57) ABSTRACT

The invention relates to a molding device (1) and a method for the manufacture of structured or semistructured composite components comprising a polymer resin (50) and a fibrous substrate (51). According to the invention, the device comprises a mold (2) comprising a bottom and a lateral surface, a part (10) that is movable along the lateral surface of the mold, comprising a compression surface (14) forming a cavity (7) with the bottom and the lateral surface (5) of said mold (2), characterized in that the movable part (10) comprises a vacuum-drawing channel (13, 23) opening into a chamber (25, 42) located above the cavity and communicating with said cavity (7).

11 Claims, 7 Drawing Sheets

(51) Int. Cl.
*B29C 43/36* (2006.01)
*B29C 33/10* (2006.01)
*B29C 33/00* (2006.01)
B29K 101/10 (2006.01)
B29K 105/08 (2006.01)

(52) U.S. Cl.
CPC ............ B29C 43/361 (2013.01); B29C 70/48 (2013.01); *B29C 33/0038* (2013.01); *B29C 2043/3628* (2013.01); *B29K 2101/10* (2013.01); *B29K 2105/08* (2013.01)

(56) References Cited

U.S. PATENT DOCUMENTS 5,141,690 A 8/1992 Marshall
2017/0361547 A1* 12/2017 Cauchois ................ B29C 70/48

* cited by examiner

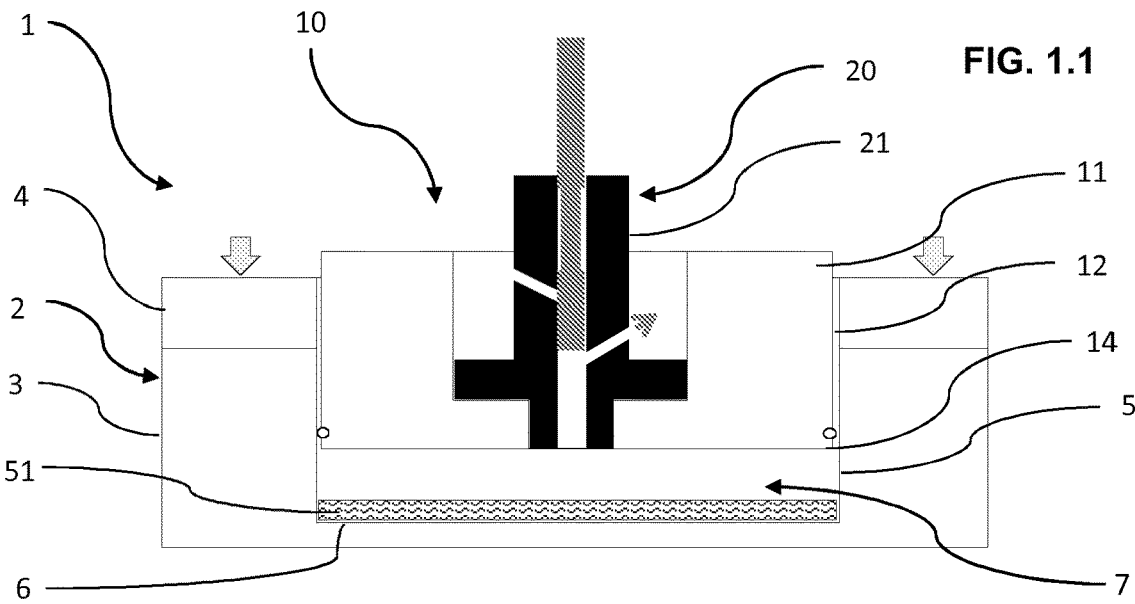
FIG. 1.1
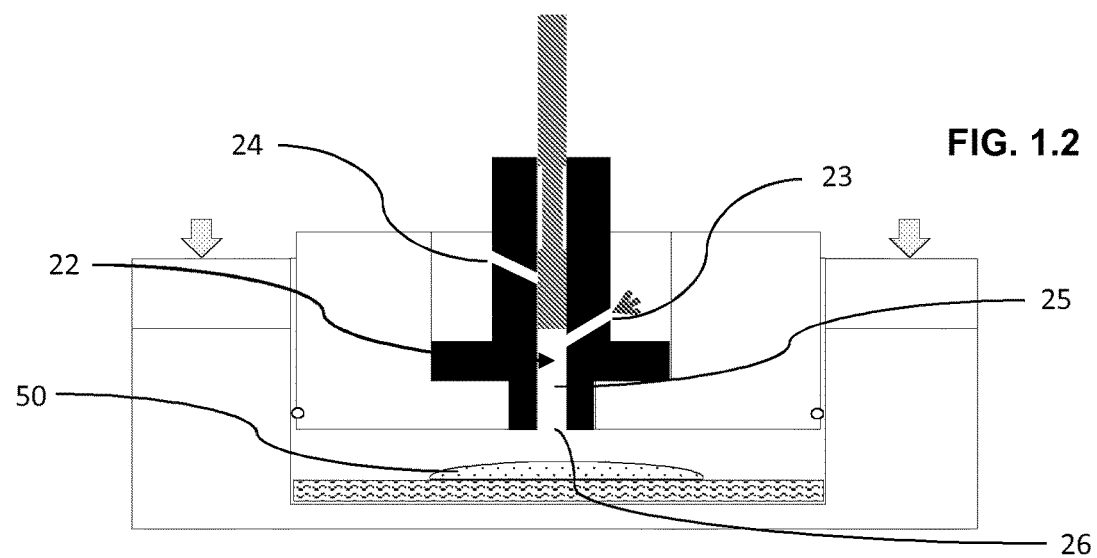
FIG. 1.2
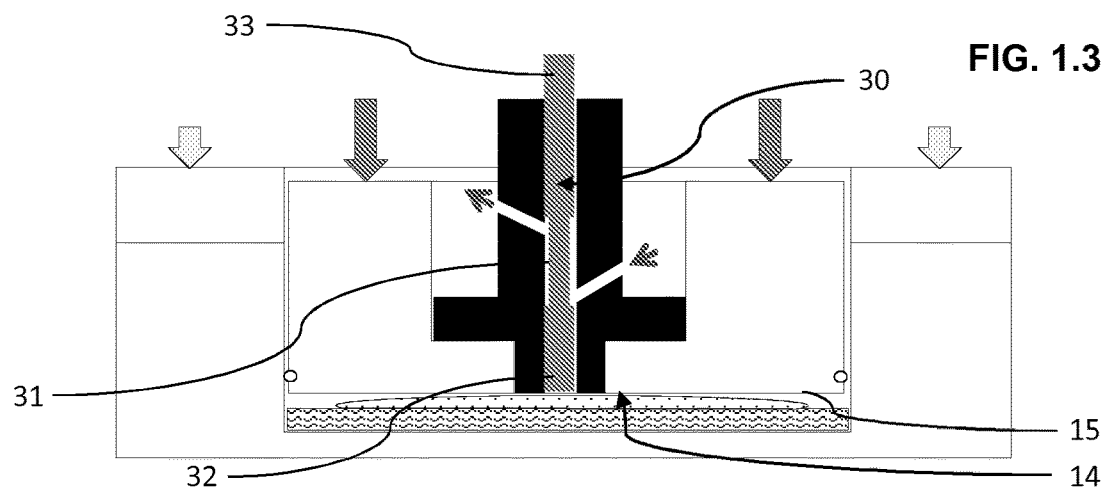
FIG. 1.3

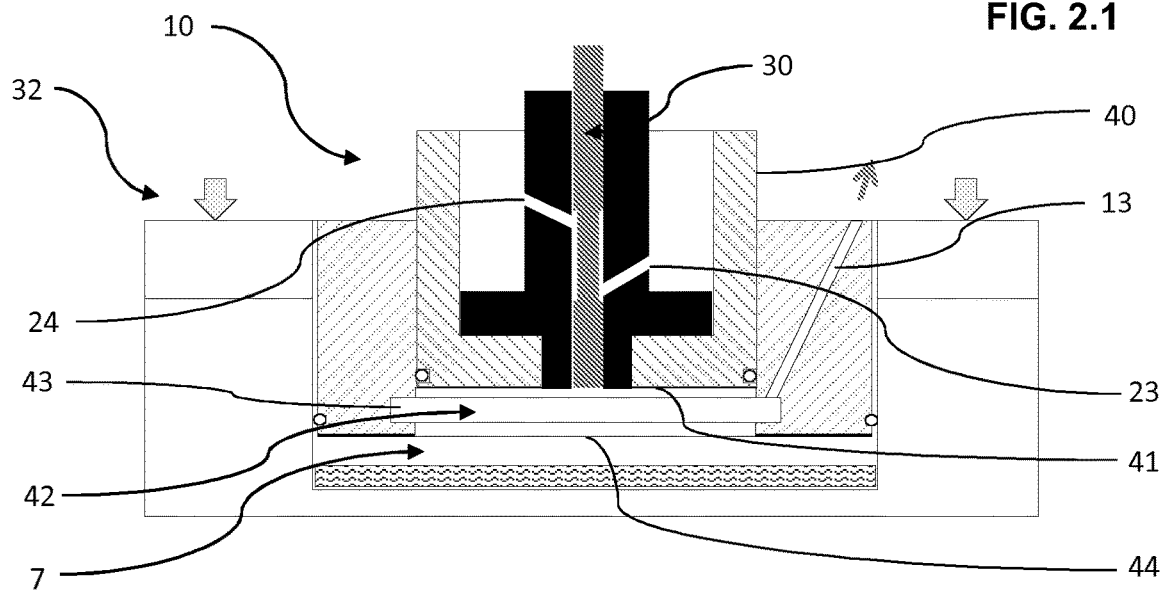
FIG. 2.1
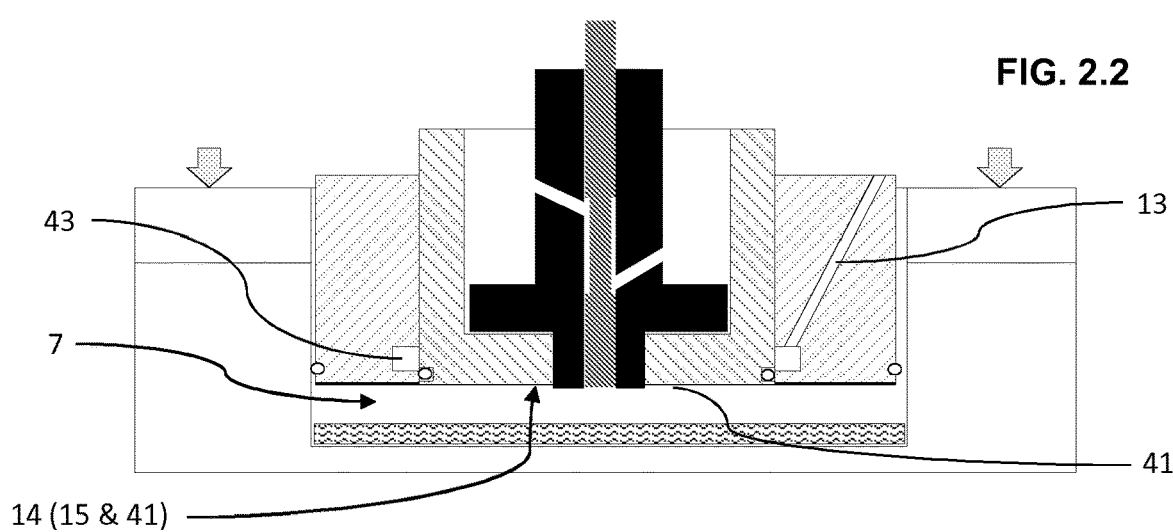
FIG. 2.2
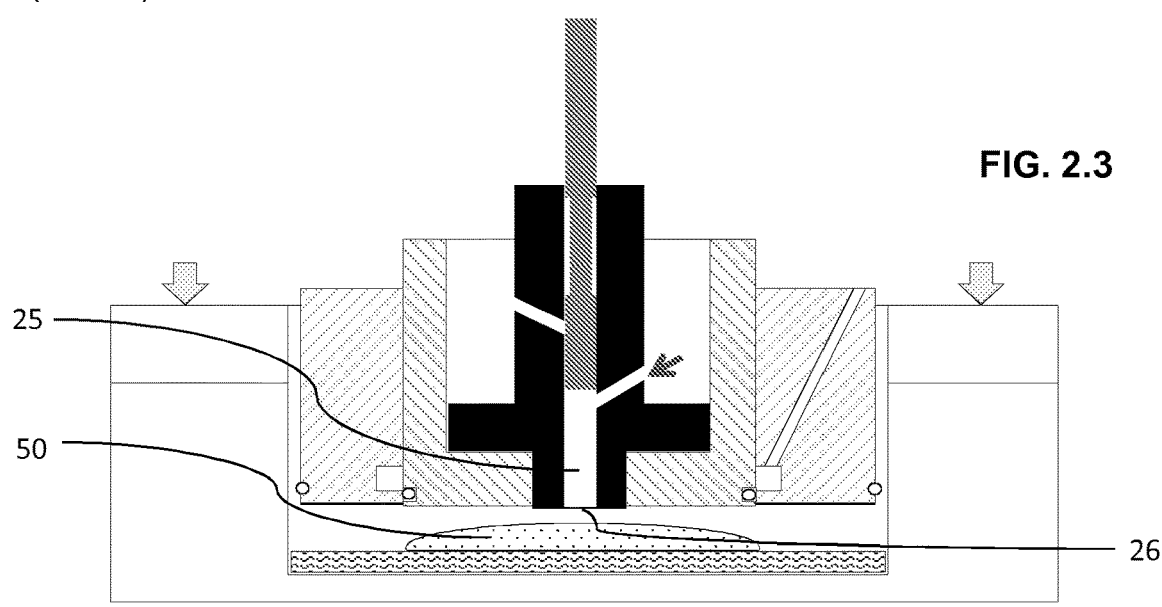
FIG. 2.3

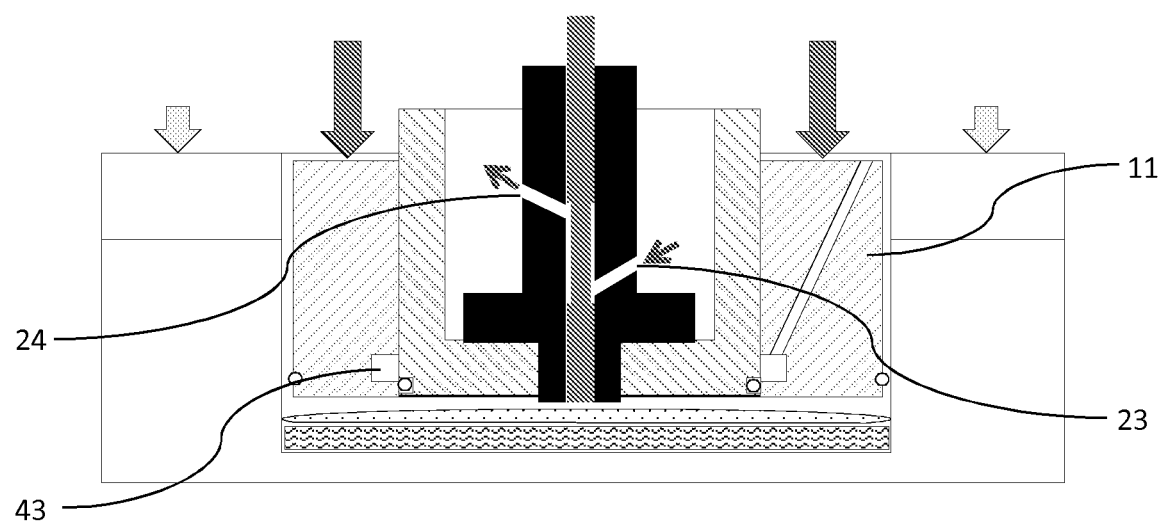
FIG. 2.4

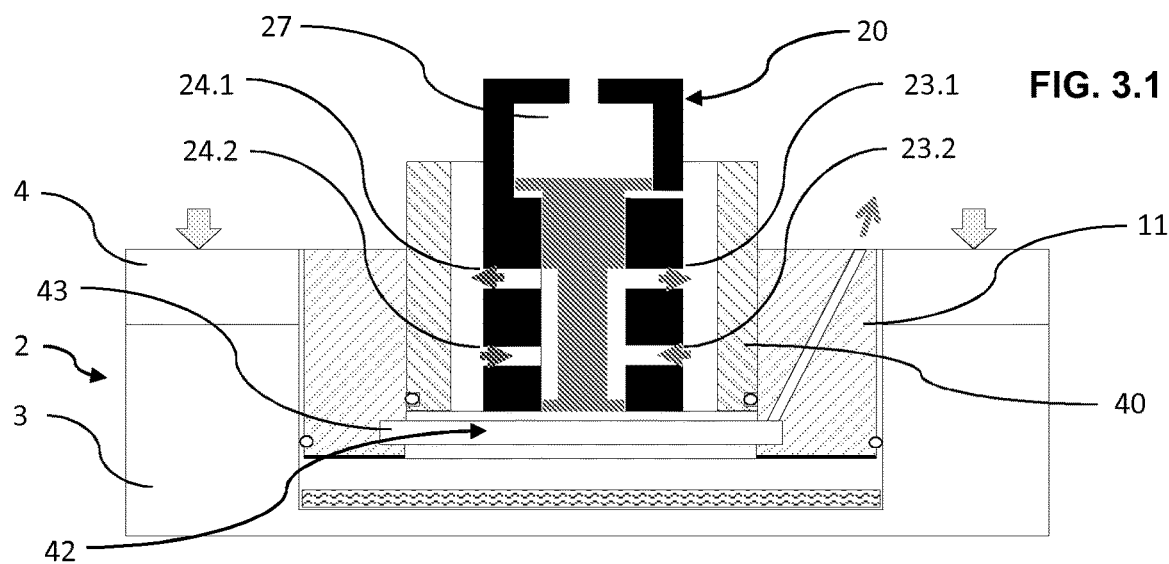
FIG. 3.1
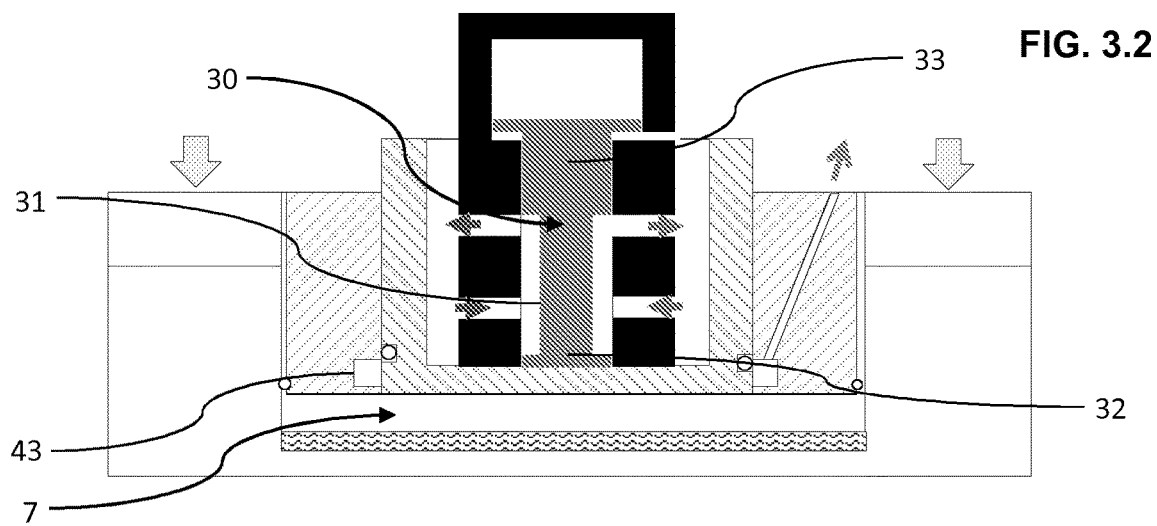
FIG. 3.2
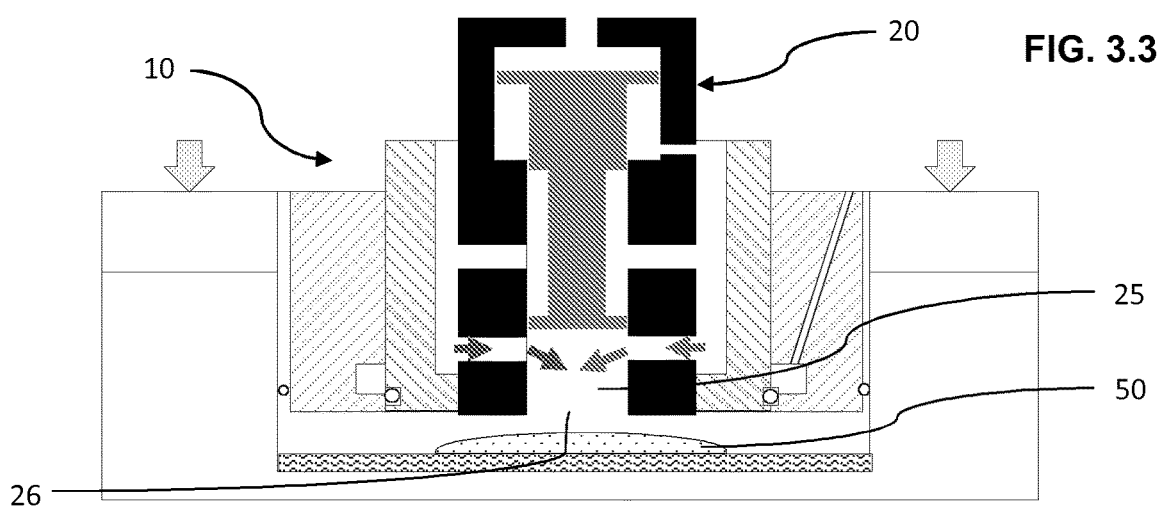
FIG. 3.3

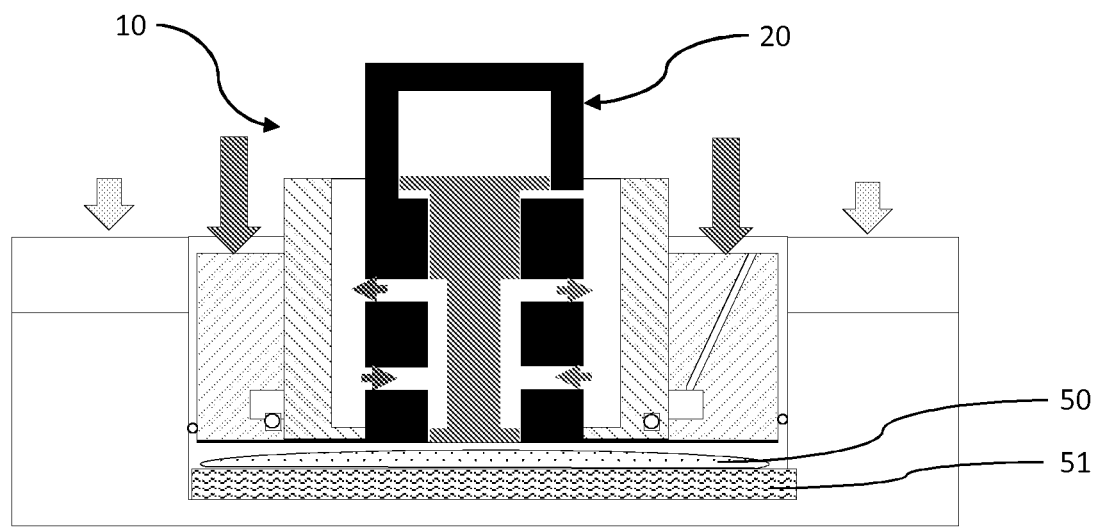
FIG. 3.4

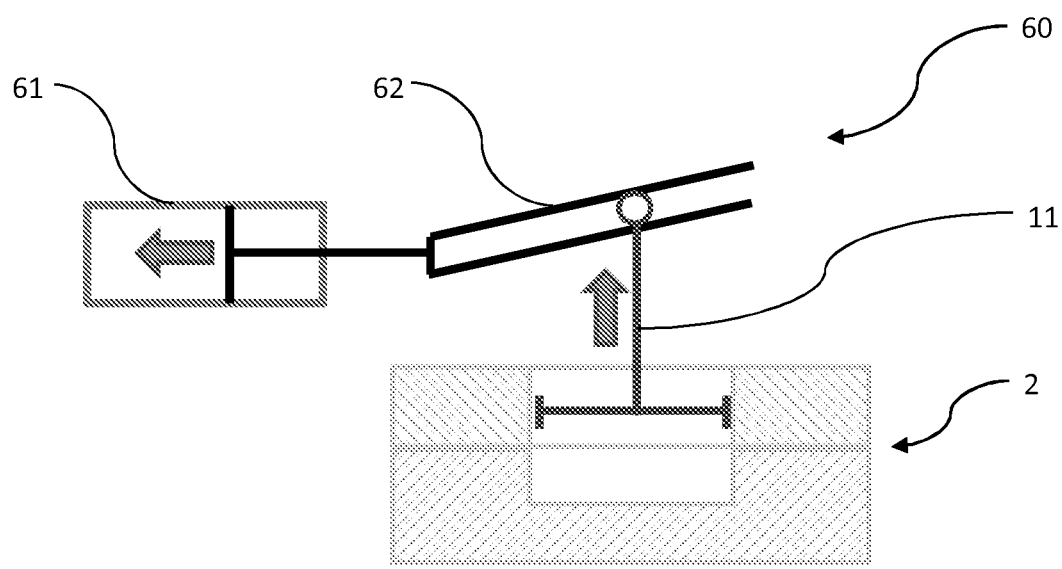
FIG. 4
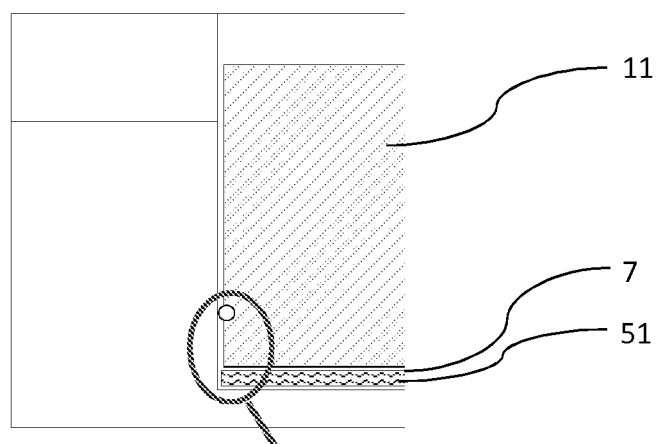
FIG. 5
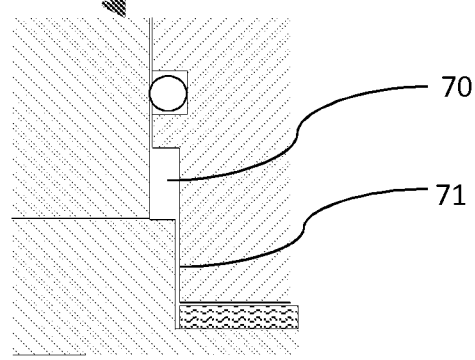

MOLDING DEVICE FOR THE MANUFACTURE OF COMPOSITE COMPONENTS USING LIQUID POLYMER RESIN

This application claims benefit, under U.S.C. § 119 or § 365 of PCT Application Number PCT/FR2015/053309, filed Dec. 3, 2015, and French Patent Application Number FR1461865, filed Dec. 3, 2014, these documents being incorporated herein by reference.

FIELD OF THE INVENTION

The invention relates to the field of molding of composite components.

More particularly, the invention relates to a molding device for the manufacture of composite components using liquid polymer resins. The invention also relates to a method for the manufacture of composite components carried out with the molding device, the components obtained by said method as well as the resins used for carrying out the method.

The method according to the invention allows single-component or multi-component injection of polymer resins. Hereinafter, we shall use the term polymer resin for a polymer resin before polymerization, and the term polymerized resin for a polymer resin after polymerization.

Certain components or certain assemblies of components such as those mentioned above are sometimes subjected to large mechanical stresses or mechanical loads. Such components are therefore very often made from composite materials.

A composite material is an assembly of at least two immiscible components. A synergy effect is obtained with such an assembly, so that the composite material obtained possesses notably mechanical and/or thermal properties that each of the initial components does not possess, or does possess but to a lower degree compared to the composite material.

Moreover, a composite material consists of at least one reinforcing material that endows said composite material with good mechanical properties, notably good behavior under the mechanical loads to which the composite material is subjected, and a matrix material, or more simply matrix, forming a continuous phase and ensuring cohesion of said composite material. Among the various types of composites used industrially, composites with organic matrixes are the commonest. In the case of composites with organic matrixes, the matrix material is generally a polymer. This polymer may be either a thermosetting polymer, or a thermoplastic polymer.

The composite material is prepared by mixing the matrix material and the reinforcing material, or by wetting or impregnating the reinforcing material with the matrix material, followed by polymerization of the system obtained. The polymer matrix, called resin hereinafter, and the reinforcement are mixed in a mold by injecting said resin into said mold.

The molds generally used in industry are molds with one or more vents for maintaining pressure equilibrium inside the mold. However, a blocked vent may lead to defects on the final component obtained after molding. Moreover, a vent generally leaves a mark on the component, so it is necessary to position the vent and/or the component so that this mark is as inconspicuous as possible, or so that it is produced on a portion of the component that is to undergo processing after molding.

In order to overcome these problems, molds have been designed without vents, working under vacuum. Before injecting the resin, vacuum is created in the mold to allow optimal impregnation of the substrate with the resin, and to obtain composite components possessing the fewest possible defects or imperfections.

Thus, document DE 20 2012 104 148 describes a molding tool formed from two complementary mold parts that can come into contact with one another to form a cavity. The lower part of the molding tool comprises a channel connected to a vacuum point and passing through the wall of said lower part. The upper part is movable notably between a so-called "open" position in which one end of the channel opens into the cavity, so that a vacuum can then be created in said cavity, and a so-called "closed" position in which the internal end of the channel is blocked by the upper part. Seals positioned along the wall of the upper part of the tool provide good hermeticity between the cavity and the channel, and thus between the cavity and the exterior. The lower part of the molding tool comprises an injection inlet, through which a resin is injected when a vacuum has been created in the cavity and the molding tool is in the closed position.

However, a molding tool of this kind is very expensive and its use may prove complicated. Moreover, the volume of the cavity decreases considerably between the open position of the molding tool, and the closed position. This large decrease in volume is due to the displacement of the upper part, which moves closer to the lower part. This change in volume is accompanied by a change in pressure within the cavity, so that the pressure during the step of injecting the resin into the cavity is greater than the pressure during the previous step of creating the vacuum in said cavity. This pressure difference may cause defects and/or imperfections in the composite components obtained.

Moreover, the volume allowing vacuum to be drawn is small, since it is determined by the volume of the channel included in the lower part of the molding tool. Now, the diameter of the channel cannot be larger than the space located between the seals provided on the upper part of the molding tool. Thus, the vacuum drawing rate is low and the molding time is high, making a molding tool of this kind unsuitable for industrial applications with a high production rate.

Document EP 0792903 describes a mold and a molding process for manufacturing composites by means of a polyimide resin and a fibrous reinforcing material. The mold comprises an upper part and a lower part, intended to be joined together. The upper part and the lower part delimit a cavity for receiving fibrous reinforcement and a resin. The upper part penetrates into the lower part, so that there is a movement of displacement of this part during mold closure. The shape of the upper part of the mold is such that this part can move into the lower part. Moreover, the mold comprises a vacuum-drawing channel located above the cavity and communicating with said cavity.

Document DE 10 2013 207668 describes a molding device for manufacturing composite material with fibrous reinforcement. The mold comprises two parts intended to be connected and to delimit a cavity for receiving the reinforcement and the resin. The molding device comprises a component consisting of a rod that moves in the channel of the upper part of the mold. The device also comprises a channel for gas evacuation that is located above the cavity and communicates with it. The function of the rod is to allow the molding to be removed after opening the mold.

The aim of the invention is therefore to rectify the drawbacks of the prior art, by proposing a molding device for the manufacture of components from composite material based on polymer resin, making it possible to obtain components that are defect-free or that have a small number of defects and/or imperfections. The molding device according to the invention also allows a fast vacuum drawing step, with a high flow rate. A device of this kind also makes it possible to maintain a constant volume of the molding cavity, as well as a negligible pressure change between drawing the vacuum and injecting the resin into the molding device.

BRIEF DESCRIPTION OF THE INVENTION

For this purpose, the invention relates to a molding device for the manufacture of structured or semistructured composite components comprising a polymer resin and a fibrous substrate, characterized in that it comprises:
 a mold comprising a bottom and a lateral surface,
 a movable part that is able to move along the lateral surface of the mold, comprising a compression surface, forming a cavity with the bottom and the lateral surface of said mold,
 mainly characterized in that the movable part comprises a vacuum-drawing channel opening into a chamber located above the cavity and communicating with said cavity.

According to another feature, the mold comprises a lower part and an upper part able to come into contact with said lower part in order to close the mold.

The movable part further comprises a punch that is able to move along the lateral surface of the mold, and an injection head, said injection head being provided with a wall defining an injection column communicating with the cavity via an opening.

According to another feature, the mold further comprises a piston comprising a lower part provided with a lower surface, an upper part, and a recess, said piston being able to move along the injection column between at least one first position, called the open position, in which its lower surface defines, with the wall of the injection head and the opening, a lower portion of the injection column, and at least one second position in which the piston blocks the opening of the injection column.

According to a first embodiment,
 the vacuum-drawing channel consists of a first channel that passes through the wall of the injection head, and opens into the chamber consisting of the lower portion of the injection column,
 the vacuum-drawing channel is also a channel for injecting polymer resin,
 the injection head further comprises a second channel that passes through the wall of the injection head, allowing evacuation of the resin from the column,
 in the closed position, at the level of its recess, the piston forms, with the wall of the injection head, the first channel, and the second channel, a circuit for recirculating uninjected resin.

According to a second embodiment, the movable part further comprises a collar that is able to move along the lateral surface of the punch, between at least one first position, called the open position, in which the lower surface of the collar defines, with the lateral surface of the punch, a shrinkage space communicating with the cavity via an opening, and at least one second position, called the closed position, in which the collar blocks said opening,
 the shrinkage space comprises a peripheral groove located in the punch,
 the vacuum-drawing channel consists of a channel located in the punch and opening into the chamber formed by the shrinkage space, or into the peripheral groove of said shrinkage space,
 the injection head further comprises at least one first channel passing through its wall for injecting the resin and at least one second channel passing through its wall for evacuation of the resin from the injection head,
 the first channel and the second channel form, with the lower surface of the piston and the opening of the injection column, a circuit for recirculating uninjected resin.

According to a third embodiment, the injection head further comprises, in its wall, at least one first lower channel for injecting the resin and at least one first upper channel for evacuating the resin from said injection head, said first lower and upper channels being positioned directly one above the other and forming, with the recess of the piston and the wall of the injection head, at least one circuit for recirculating the uninjected resin,
 the injection head further comprises, in its wall, at least one second lower channel for injecting the resin and at least one second upper channel for evacuating the resin from said injection head, said second lower and upper channels being positioned directly one above the other and forming, with the recess of the piston and the wall of the injection head, at least one circuit for recirculating the uninjected resin,
 the injection head comprises, in its wall, n lower channels for injecting the resin and m upper channels for evacuating the resin from the injection column, n being greater than or equal to 2, m being greater than or equal to 2, n being equal to or different than m, so as to form n circuits for recirculating the uninjected resin if n is less than m, or m recirculating circuits when m is less than n,
 the upper part of the injection column consists of a space that is intended to be placed under pressure, and is able to receive the upper part of the piston, said piston being hydraulic, in order to allow displacement of said piston along the injection column.

The invention also relates to a method for the manufacture of structured or semistructured composite components comprising a polymer resin and a fibrous substrate, mainly characterized in that it is carried out using an injecting device, and comprises the following steps:
 a) positioning the fibrous substrate in the cavity,
 b) drawing vacuum in the cavity via the vacuum-drawing channel located in the movable part of the molding device,
 c) impregnating the fibrous substrate by injecting a predetermined amount of polymer resin into the cavity via the resin injecting channel, then compression of said resin by the movable part of the molding device.

According to another feature, the method further comprises a step of cleaning the uninjected resin in the cavity, and said cleaning step may be carried out before, during, or after the resin compression step.

Prior to the resin injection step, the method comprises a chamber closing step.

The chamber closing step consists of blocking the opening of the lower portion of the injection column by the lower surface of the piston, by displacement of said piston into the closed position.

The chamber closing step consists of blocking the opening of the shrinkage space by the lower surface of the collar, by displacement of said collar into the closed position.

The method allows single-component injection of the polymer resin with the three embodiments of the molding device and more advantageously with the first and second embodiments.

The method allows two-component injection of the polymer resin with the third embodiment of the molding device.

The invention also relates to a liquid polymer resin for carrying out the single-component method of manufacture, selected from thermosetting polyester resins, thermosetting vinyl-ester resins, thermosetting acrylic resins, mixtures of said thermosetting polyester, vinyl-ester, and acrylic resins, thermoplastic acrylic resins, thermoplastic polyamide resins.

The invention also relates to a liquid polymer resin for carrying out the two-component method of manufacture, selected from thermosetting polyester resins, thermosetting vinyl-ester resins, thermosetting acrylic resins, mixtures of said thermosetting polyester, vinyl-ester, and acrylic resins, thermosetting polyurethane resins, thermosetting epoxy resins, thermoplastic acrylic resins, thermoplastic polyamide resins.

The invention also relates to a structured or semistructured composite component, obtained by carrying out the method of manufacture, said component being usable in the field of automobiles, highway transport for example for trucks, rail, maritime, and aeronautical transport, wind power, photovoltaics, (thermal) solar, building, civil engineering, furniture and urban infrastructure, signaling, sports and leisure activities.

According to an advantageous feature, the structured or semistructured composite component obtained is called "net-shape", i.e. it does not comprise any residual molding sprue and is usable after mold release without any finishing treatment.

BRIEF DESCRIPTION OF THE DRAWINGS

Other advantages and features of the invention will become clear on reading the following description, given as an illustrative, nonlimiting example, referring to the schematic diagrams of the molding device shown in the appended figures:

FIG. 1.1, a sectional view of the molding device in the vacuum drawing step, according to a first embodiment of the invention.

FIG. 1.2, a sectional view of the molding device in the resin injection step, according to a first embodiment of the invention.

FIG. 1.3, a sectional view of the molding device in the resin cleaning and compression steps, according to a first embodiment of the invention.

FIG. 2.1, a sectional view of the molding device in the vacuum drawing step, according to a second embodiment of the invention.

FIG. 2.2, a sectional view of the molding device in the collar closing step, according to a second embodiment of the invention.

FIG. 2.3, a sectional view of the molding device in the resin injection step, according to a second embodiment of the invention.

FIG. 2.4, a sectional view of the molding device in the resin cleaning and compression steps, according to a second embodiment of the invention.

FIG. 3.1, a sectional view of the molding device in the vacuum drawing step, according to a third embodiment of the invention, FIG. 3.2, a sectional view of the molding device in the collar closing step, according to a third embodiment of the invention.

FIG. 3.3, a sectional view of the molding device in the resin injection step, according to a third embodiment of the invention.

FIG. 3.4, a sectional view of the molding device in the resin cleaning and compression steps, according to a third embodiment of the invention.

FIG. 4, a schematic diagram of an angled return system.

FIG. 5, a schematic diagram of resin storage means.

DETAILED DESCRIPTION OF THE INVENTION

Figure 6:
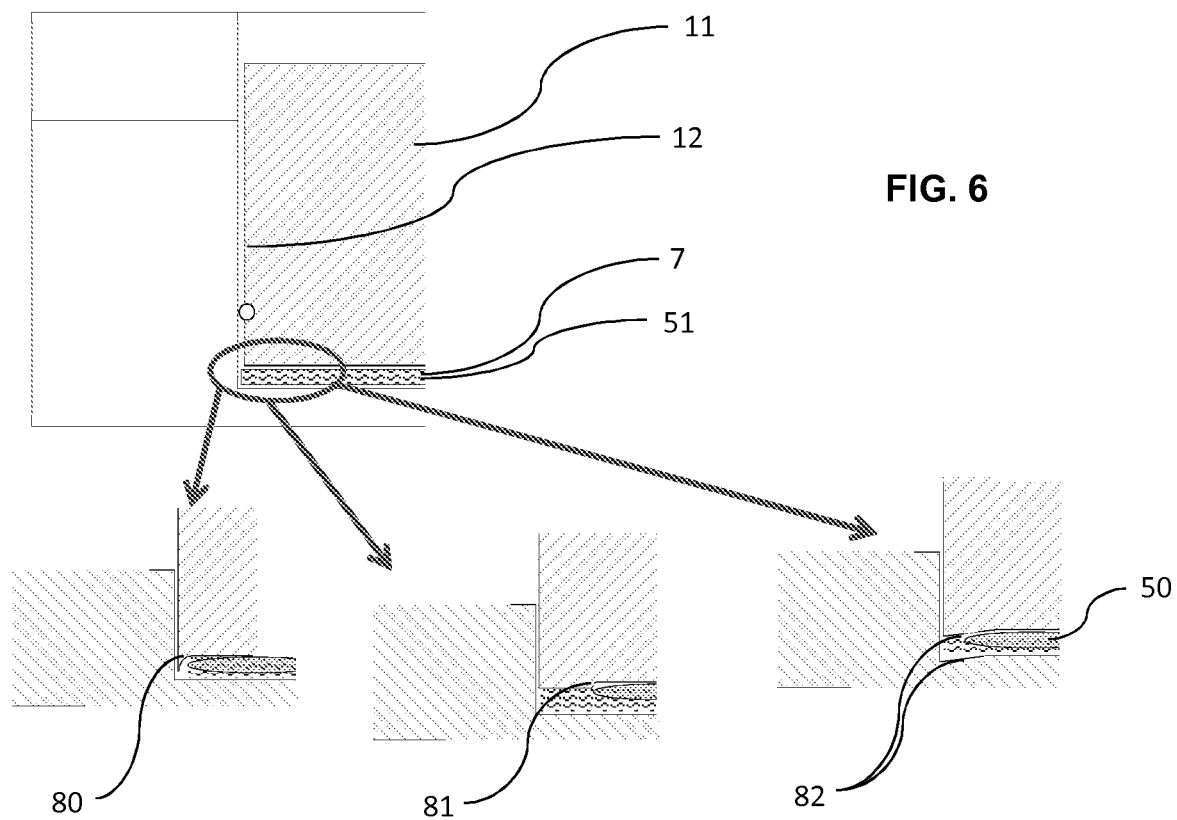
FIG. 6, a schematic diagram of peripheral narrowing means.

In the description given hereunder, the molding device according to the invention is first presented in general terms, and then the device is described in more detail on the basis of three particular embodiments.

General Description of the Molding Device

The term "monomer" as used herein refers to a molecule that can undergo polymerization.

The term "polymerization" as used herein refers to the process of transformation of a monomer or of a mixture of monomers into a polymer. An oligomer is a polymer comprising a small number of monomers.

"Multi-component injection" means injection of a resin comprising at least two components, said components only being brought into contact starting from the step of injection of said resin in a molding device. The present document presents two-component injection in particular, i.e. injection of a resin comprising two components A and B, said components only being brought into contact starting from the step of injection of said resin in a molding device.

"Single-component injection" means injection of a resin comprising at least two components, said components being brought into contact before the resin is used for carrying out a molding process. The resultant mixture is generally stored at low temperature to prevent it polymerizing before it is used.

The molding device 1 comprises a mold 2 comprising a lower part 3 and an upper part 4 that is able to come into contact with said lower part, so that it comes to rest on the fixed part, in order to close the mold. The mold 2 comprises a bottom 6 provided in its lower part 3, intended to receive the fibrous reinforcement. The bottom is limited peripherally by the lateral surface 5 of the mold.

The molding device also comprises a movable part 10 that is able to move along the lateral surface 5 of the mold. Said movable part comprises a compression surface 14 forming a cavity 7 with the lateral wall 5 of the mold and the bottom 6 of the mold. The movable part also comprises a punch 11 that is able to move along the lateral surface 5 of the mold 1, as well as an injection head 20 which is comprised within said punch, so that it is surrounded by said punch according to a first embodiment, or within a collar 40, housed in the punch 11 according to the second and the third embodiment described hereunder.

The movable part 10 also comprises a vacuum-drawing channel 23 or 13, intended to be connected to a vacuum drawing device such as a vacuum pump for example. The channel opens into a chamber 25 or 42 according to the embodiments described in detail hereunder. This chamber 25 or 42 is located above the cavity 7 and communicates with said cavity 7 via an opening 26 on this cavity.

Advantageously, the molding device 1 further comprises a system for applying movement 60 to the movable part 10, in particular the punch, making it possible to apply a constant pressure on said movable part in order to compress the resin-substrate assembly as the resin polymerizes, throughout the polymerization reaction of said resin.

In fact, during polymerization of the resin 50, following impregnation of the fibrous substrate 51 with said resin, a phenomenon of volume shrinkage of said resin is observed. The volume occupied by the resin-substrate assembly decreases as the reaction of polymerization of the resin proceeds, so that the volume occupied by the polymerized resin-substrate assembly obtained at the end of the polymerization reaction is smaller than the volume occupied by the initial resin-substrate assembly. The system described makes it possible to obtain optimal impregnation of the fibrous substrate with the resin, as it allows the movable part 10, and in particular the compression surface 14 of said movable part, to remain in contact with the resin-substrate assembly, and compress said resin-substrate assembly throughout the polymerization reaction.

Advantageously, the system comprises an angled return system 60 in translation, as shown in FIG. 4. The system comprises a jack (cylinder) 61 that applies a load on an angled return in translation 62, said angled return being positioned so as to be offset by an angle α to the longitudinal axis of the jack. The angled return is connected to the punch 11 and transmits the load to the punch, allowing said punch to describe a movement of translation and to slide along the lateral surface 12 of the mold.

For carrying out the method for the manufacture of composite components, it is necessary to have precise control of the movement and positioning of the movable part 10, and in particular of the punch 11, during all the steps of the method. For this purpose, the jack 61 is preferably a double-acting jack.

The system 60 described advantageously allows displacement of the punch 11 while compensating the shrinkage of the resin during the polymerization of said resin by applying a constant pressure on the punch. The pressure exerted is notably determined as a function of the type of resin and the volume of resin injected. This system 60 makes it possible to obtain excellent homogeneity of impregnation of the fibrous substrate with the resin, giving composite components possessing good mechanical properties as well as a good surface finish, without asperities.

The molding device 1 advantageously comprises storage means allowing a surplus of injected resin to be received, when the volume of resin injected is greater than the volume required for optimal impregnation of the fibrous substrate in the mold. The storage means, as shown in FIG. 5, advantageously comprise a reserve chamber 70 able to receive the surplus of injected resin 50, said reserve chamber being connected to the cavity 7 by a line 71. In this way, when the volume of resin injected is greater than the volume required for optimal impregnation of the fibrous substrate, the surplus resin makes use of the line and enters the reserve chamber 70.

The presence of this reserve chamber 70 gives a wider window for injection of resin, because when the optimal impregnation volume is exceeded, the surplus will go into the reserve chamber. Thus, these storage means can guarantee optimal impregnation of the fibrous substrate, so that composite components possessing good mechanical properties are obtained.

In all three embodiments, the molding device advantageously comprises means for peripheral narrowing of the cross section of the component consisting of a change in the geometry of the lower surface of the punch and/or of the bottom of the mold. The narrowing means as shown in FIG. 6 are located near the lateral surface 12 of the punch and/or the lateral surface 5 of the mold and are illustrated by three configuration variants bearing the references 80, 81 and 82 in FIG. 6.

In the first variant, the lower surface 15 of the punch is curved so as to form a lip 80. In the second variant, the lower surface of the punch comprises a notch 81. In the third configuration, the lower surface of the punch and the bottom 6 of the mold comprise a change of slope, so as to form an incline.

Said means (80, 81, 82) for peripheral narrowing of the cross section of the component give good homogeneity of impregnation of the fibrous substrate 51 with the resin 50 notably by avoiding formation of dry zones corresponding to zones of the substrate where impregnation of said substrate with the resin is slight or even non-existent. Said means (80, 81, 82) for peripheral narrowing of the cross section of the component thus make it possible to obtain composite components possessing good mechanical properties.

DETAILED EXAMPLE OF THREE EMBODIMENTS OF THE MOLDING DEVICE AND MANUFACTURE OF COMPOSITE COMPONENTS ACCORDING TO THESE THREE EMBODIMENTS

In the following there will be mention of a "low-pressure" injection head or of a "high-pressure" injection head. The so-called "low-pressure" injection head relates to the first embodiment and the second embodiment, and the so-called "high-pressure" injection head relates to the third embodiment.

First Embodiment Illustrated in FIGS. 1.1, 1.2 and 1.3

The molding device 1 comprises a mold 2 comprising a lower part 3 and an upper part 4 that is able to come into contact with said lower part in order to close the mold. The mold comprises a bottom 6 provided in its lower part, said bottom being delimited at the periphery by the lateral surface 5 of the mold.

The molding device allows single-component injection of resin 50. As described above, it comprises a movable part 10 able to move along the lateral surface 5 of the mold, a punch 11 arranged in this movable part, able to move along the lateral surface of the mold, and an injection head 20 located in the punch. The injection head 20 is integral with the punch, so that a displacement of the punch leads to a corresponding displacement of said injection head. The lower surface 15 of the punch constitutes the compression surface 14, forming the cavity 7 with the lateral wall 5 of the mold and the bottom 6 of the mold.

The injection head 20 is a low-pressure injection head, used notably when the injection pressure of the resin 50 is between 1 bar and 20 bar. It comprises a wall 21 delimiting an approximately vertical injection column 22, said injection column notably being intended to receive the polymer resin while carrying out the method for the manufacture of composite components according to the invention.

The injection head 20 comprises, in its wall 21, a first channel 23 and a second channel 24 opposite the first channel and located at a different level than said first channel relative to the longitudinal axis of the injection head. The first channel 23 is called "lower" and the second channel is called "upper". Moreover, the first channel 23 can be connected to a vacuum drawing device (not shown), such as a vacuum pump, for drawing the vacuum. The first channel 23 also constitutes an inlet channel for the resin into the injection column during injection of the resin. Thus, the first channel 23 serves on the one hand for drawing vacuum into the cavity, and on the other hand for injecting the resin in the injection column. This dual function is implemented by means of a switching system, not shown, advantageously provided upstream of the injection head.

The movable part 10 comprises a piston 30 able to move in the injection column 22 of the injection head between at least one first position called the open position, and at least one second position called the closed position. In the open position, the bottom end 32 of the piston, the wall 21 of the injection head, and the opening 26 of the column delimit the chamber 25, which corresponds in practice to a portion of the column 22 communicating with the cavity 7 via the opening 26, and communicating with the first channel 23. In the closed position, the opening 26 of the column is blocked by the bottom end 32 of the piston.

The piston 30 comprises a recess 31 on a part of its length, the dimension of which is variable and depends on the dimensions of the injection head and of the molding device. The cross section of the piston along the recess is reduced relative to the cross section of the piston body. Said recess delimits, with the inside surface of the injection column, a circuit for recirculating the uninjected polymer resin.

The vacuum is drawn via the first channel 23 provided in the wall of the injection head. During the vacuum drawing step, piston 30 is in the open position, blocking the second channel 24 without blocking the first channel, so that a vacuum is created in the cavity 7 of the mold, and in the chamber formed by the column portion 25 of the injection head 20, without any escape of air via the injection head, in particular via the second channel 24.

The resin 50 is then injected into the cavity 7 of the mold via the first channel 23 of the injection head so as to impregnate the fibrous substrate 51 placed in said cavity beforehand. During injection of the resin, piston 30 remains in the open position, so as to block the second channel 24 without blocking the first channel 23.

When the desired amount of resin has been injected, piston 30 is displaced to the closed position so as to block the opening 26 of the portion of injection column. In the closed position, recess 31 of the piston forms, with the wall 21 of the injection head, the first channel 23, and the second channel 24, a circuit for recirculating uninjected resin. During the step of cleaning the uninjected resin, the resin circulates in the injection column 22 via the first channel 23, circulates in the recess 31 of the punch, and leaves said column via the second channel 24, allowing evacuation of the resin.

After cleaning the recirculating circuit, punch 11 moves along the lateral surface 5 of the mold until it reaches a low position, which varies depending on the type and volume of resin injected, so that it comes into contact with said injected resin. The movable part 10 compresses the resin, allowing maximal spreading of the resin on the entire surface of the fibrous substrate, as well as optimal impregnation of the fibrous substrate with said resin. The step of cleaning the resin recirculating circuit may be carried out before, during, or after the compression step. Preferably, the cleaning and compression steps take place simultaneously.

When the molding process is carried out with the molding device described in this embodiment it is possible to obtain a volume of the cavity 7 that remains constant between the vacuum drawing step and the step of resin injection. In fact, punch 1$i$ is in the high position and remains in the high position while the vacuum drawing step and the resin injection step are carried out. Such invariance of the cavity is not found with the molding devices of the prior art, for which the volume of the cavity decreases and the pressure in the cavity increases between the vacuum drawing step and the resin injection step.

Second Embodiment Illustrated in FIGS. 2.1, 2.2, 2.3, 2.4

The molding device comprises all the elements described in the preceding first embodiment and a collar 40. The molding device is intended for single-component injection of resin. In fact, in the second embodiment, the movable part 10 of said molding device 1 comprises a collar 40 in which a "low-pressure" injection head 20 is located, so that said collar surrounds said low-pressure injection head. The collar 40 is able to move along the lateral surface 12 of the punch 11, and relative to the lateral surface 5 of the mold. In particular, the collar is able to move between at least one first position called the open position and at least one second position called the closed position.

When the collar is in the open position, its lower surface 41 delimits, with the lateral surface 12 of the punch and an opening 44, a chamber consisting of a shrinkage space 42 communicating with the cavity 7 via said opening, and opening into a channel 13.

The shrinkage space 42 comprises a peripheral groove 43 located on the lateral surface 12 of the punch. Said groove is preferably of rectangular cross section and extends over the entire periphery of the lateral surface of the punch. The presence of a peripheral groove makes it possible to obtain a very high vacuum drawing volume and a very high vacuum drawing rate, and thus a vacuum drawing time that is greatly reduced compared to the devices commonly used in industry. A molding device of this kind notably makes it possible to obtain a vacuum drawing time less than or equal to 5 seconds for a component with a surface area equal to 1 m$^2$, whereas the drawing time obtained in industry is generally greater than 1 minute.

The vacuum is drawn via channel 13 located in the punch of the movable part 10, one end of which opens into the chamber formed by the shrinkage space 42, in particular in the peripheral groove 43 of the shrinkage space communicating with the cavity 7, and the other end opens onto the exterior of the punch and is connected to a vacuum drawing system, such as a vacuum pump for example.

In the vacuum drawing step, piston 30 is in the closed position and blocks the opening 26 of the injection column 22. The punch 11 is in the high position, and the collar 40 is in the open position so as to form the shrinkage space 42. When a vacuum is created in the cavity and in the shrinkage space, the collar moves along the lateral surface 12 of the punch until it is in the closed position, thus filling the shrinkage space 42. The collar obstructs the groove to prevent entry of air via channel 13 into the cavity 7 during the subsequent steps of the process. In the closed position, the lower surface 41 of the collar 40 is located at the same level as the lower surface 15 of the punch, so that said lower surfaces of the collar and punch constitute a compression surface 14. The collar is then fixed to the punch, becoming integral with said punch, to guarantee hermeticity of the cavity.

The resin 50 is then injected into the cavity 7 of the mold in order to impregnate the fibrous substrate 51 placed in said cavity beforehand. During injection of the resin, the punch 11 remains in the high position and the collar remains in the closed position. Similarly to the first embodiment, the resin is injected via the first channel 23 of the injection head, flows along the injection column, and then comes into contact with the fibrous substrate in the cavity.

Similarly to the preceding first embodiment, when the desired amount of resin has been injected into the mold cavity, piston 30 is displaced to the closed position so as to block opening 26 of the portion of injection column 25. In the closed position, recess 31 of the piston 30 forms a resin recirculating circuit with the wall of the injection head, the first channel 23, and the second channel 24. During the cleaning step, the resin 50 circulates in the first injection channel 23, circulates in the injection column in the recess of the piston, and leaves said column via the second channel 24, allowing evacuation of the resin.

After cleaning, the movable part 10 of the molding device moves along the wall of the mold until it reaches a low position, which varies depending on the type and volume of resin injected, so that the compression surface 14 comes into contact with said injected resin. The movable part compresses the resin, allowing maximal spreading of the resin on the entire surface of the fibrous substrate 51, as well as optimal impregnation of the fibrous substrate with said resin. The cleaning step may take place before, during, or after the compression step. Preferably, the cleaning and compression steps take place simultaneously.

Third Embodiment Illustrated in FIGS. 3.1, 3.2, 3.3, 3.4

The molding device comprises the elements 2, 3, 4 and 11 described in the preceding second embodiment, but differs with regard to the structure and the operation of the injection head and of the piston that is movable in said injection head. The molding device is mainly intended for two-component injection of resin, but also allows single-component injection of resin.

In fact, the so-called "high-pressure" injection head 20 may be used with a resin injection pressure generally between 50 bar and 100 bar. It comprises, in its wall 21, a first lower channel 23.1 and a first upper channel 23.2 located directly one above the other, as well as a second lower channel 24.1 and a second upper channel 24.2 located directly one above the other. The first and second lower channels are opposed relative to one other and face one another. Similarly, the first and second upper channels are opposed relative to one other and face one another.

The injection head 20 further comprises a hydraulic piston 30 comprising a recess 31 on a part of its length, said hydraulic piston being able to move along the column 22 of said injection head between at least one first position, called the open position, and a second position, called the closed position.

In the open position, the bottom end 32 of the piston, the wall 21 of the injection head, and the opening 26 of the column delimit a column portion 25 notably intended to receive a polymer resin before it is injected into the cavity 7.

In the closed position, the opening of the column 26 is blocked by the bottom end 32 of the piston. Moreover, the recess 31 provided on a part of the hydraulic piston and the upper and lower channels form circuits for circulating polymer resin. A first circuit is formed by recess 31 of the piston, the first lower channel 23.1, and the first upper channel 23.2. A second circuit is formed by recess 31 of the piston, the second lower channel 24.1, and the second upper channel 24.2.

As described above, the piston 30 is a hydraulic piston allowing injection of the polymer resin at high pressure. So as to be able to apply such pressure on the piston, the injection head comprises a space 27 able to receive the upper end 33 of the piston.

Drawing of the vacuum is carried out similarly to the second embodiment, via a channel 13 located in the punch of the movable part, one end of which opens into the chamber formed by the shrinkage space 42, in particular in the peripheral groove 43 of the shrinkage space communicating with the cavity 7 via an opening 44, and the other end opens onto the exterior of the punch and is connected to a vacuum drawing system, such as a vacuum pump for example.

In the vacuum drawing step, the piston is in the closed position and blocks the opening 26 of the injection column. The punch 11 is in the high position, and the collar 40 is in the open position so as to form the shrinkage space 44. Components A and B are recirculated in the injection head, in the first circuit and in the second circuit, respectively. The rate of recirculation of components A and B is adjusted so as to allow optimal mixing of said components at high pressure during the subsequent step of resin injection. In particular, the rate of recirculation of components A and B may be the same or different than the rate of injection of the resin during the subsequent step of resin injection.

When a vacuum has been created in the cavity and in the shrinkage space, the collar 40 moves along the lateral surface 12 of the punch until it is in the closed position, thus filling the shrinkage space 42. The collar obstructs groove 43 in order to prevent entry of air via channel 13 into the cavity 7 during the subsequent steps of the method. In the closed position, the lower surface 41 of the collar is located at the same level as the lower surface 15 of the punch, so that said lower surfaces of the collar and of the punch form a compression surface 14. The collar is then fixed to the punch, becoming integral with said punch, in order to guarantee hermeticity of the cavity.

The resin 50 is then injected into the cavity 7 of the mold in order to impregnate the fibrous substrate 51 placed in said cavity beforehand. In the resin injection step, piston 30 is in the open position, and the first lower channel 23.1 and the second lower channel 24.1 thus open into the column portion 25.

Components A and B are injected via the first lower channel and the second lower channel, respectively, into the column portion where they come into contact with one another at high pressure. The injection pressure and the rate of injection of components A and B may be selected to be the same or different than the recirculation pressure and the rate of recirculation of said components A and B.

Bringing components A and B into contact in the column portion at high pressure and with a high flow rate makes it possible to obtain homogeneous mixing of said components, and thus obtain a homogeneous polymer resin, for optimal impregnation of the fibrous substrate.

When the desired amount of resin has been injected into the mold cavity, piston 30 is displaced to the closed position so as to block opening 26 of the portion of injection column. Components A and B are then recirculated in the injection head, in the first circuit and in the second circuit, respectively, as in the vacuum drawing step.

After recirculation of the resin, the movable part 10 of the molding device moves along the lateral surface 5 of the mold until it reaches a low position, which varies depending on the type and volume of resin injected, so that the compression surface 14 comes into contact with said injected resin. The movable part compresses the resin, allowing maximal spreading of the resin on the entire surface of the fibrous substrate, as well as optimal impregnation of the fibrous substrate with said resin. The resin recirculating step may be carried out before, during, or after the compression step. Preferably, the recirculation and compression steps take place simultaneously.

Injection may be carried out in single-component or in two-component mode. In particular, components A and B may be identical or different.

Components A and B may also be different and each may consist of a, different polymer resin, leading to two-component injection of two different polymer resins.

Injection may be carried out in multi-component mode, i.e. with a number of components greater than or equal to 2, suitably adapting the number of lower and upper channels as well as the number of circuits for recirculation of resin.

Alternatively, it is also possible to inject only component A or only component B, in single-component mode, each consisting of one polymer resin.

Method for the Manufacture of Structured or Semistructured Composite Components

The molding device described allows the manufacture of structured or semistructured composite components. The components are obtained as described with the various embodiments by molding using polymer resin, notably with one or more thermoplastic or thermosetting polymer resins, and a fibrous substrate. These polymer resins may also be called prepolymers, as they are the precursors of the polymer matrix of the composite material obtained after they undergo polymerization in the molding device used in the molding process.

The method comprises more particularly the steps of:
  positioning a fibrous substrate 51 on the bottom 6 of the cavity 7 of the molding device. The mold 2 of the molding device is in the open position to allow positioning of the fibrous substrate in the cavity of said mold. The molding device is then closed by bringing the upper part 4 and the lower part 3 of said molding device into contact and then by pressing said upper part against said lower part by means of a closure system, such as a press for example, or any other molding device closure system commonly used in industry.
  creating a vacuum in cavity 7, or drawing vacuum into the cavity, via the channel provided for this purpose. The vacuum-drawing channel is located in the movable part of the molding device and opens into the chamber 25 or 40 that communicates with the cavity 7. The vacuum-drawing channel is intended to be connected to a vacuum drawing system, such as a vacuum pump for example, for executing the step of drawing vacuum into the cavity. Thus, at the end of the vacuum drawing step, a vacuum is created in the chamber and in the cavity.
  impregnation of the fibrous substrate, previously positioned in the cavity 7 of the molding device, with the polymer resin, in single-component or in multi-component mode, in particular in two-component mode.

The impregnation step comprises a step of injecting resin into the cavity and then a step of compression of said resin and of the fibrous substrate.

The resin is injected via the injection channel located in the movable part 10, which is the same as that used previously for drawing vacuum in the first embodiment. This channel is provided in the wall of the injection head 20, and comprises one end opening into the injection column 22, and another end opening onto the exterior of the injection head. A predetermined amount of resin 51 is injected via the channel, passes through the injection head, and then comes into the cavity, coming into contact with the fibrous substrate 51 to form a composite material. After polymerization of the resin, a polymerized resin is obtained, which constitutes the polymer matrix of the composite material.

The method of molding carried out with the molding device according to the invention makes it possible to obtain a volume of the cavity 7 that does not vary between the vacuum drawing step and the step of resin injection 50. The proposed molding device also makes it possible to obtain a pressure that is invariant or quasi-invariant between the vacuum drawing step and the step of resin injection. "Quasi-invariant pressure" means negligible variation of pressure in the cavity, as well as negligible effects of said variation of pressure on the quality of the composite components obtained.

In fact, in the first embodiment, the position of the punch 11 does not change between drawing the vacuum and injecting the resin. In the second and third embodiments, the punch remains fixed and only the collar 40 moves from the open position to the closed position, to fill the chamber formed by the shrinkage space 42. The increase in pressure in the cavity 7 due to the displacement of the collar is negligible, since the ratio of the area of the opening 26 of the shrinkage space to the total area of the cavity, and thus of the area of component obtained, is less than 5%.

The molding device for the manufacture of composite components according to the second and third embodiments of the invention also makes it possible to obtain a very large area of vacuum drawing, and thus generate a vacuum greater than 100 mbar, preferably greater than 50 mbar, in less than 10 seconds, preferably less than 5 seconds. Very high vacuum means a pressure in the mold and preferably in the cavity below 100 mbar, preferably below 50 mbar.

A molding device of this kind consequently makes it possible to obtain composite components with a smaller number of defects and/or imperfections, and optimal impregnation of the fibrous substrate with the polymer resin.

Fibrous Substrate

Regarding the fibrous substrate, said substrate preferably has dimensions corresponding to the dimensions of the molding cavity, so that said fibrous substrate covers the bottom of said molding cavity completely or almost completely.

The fibrous substrate preferably comprises long fibers, whose L/D ratio (ratio of length to diameter) is greater than 1000, preferably greater than 2000, advantageously greater than 3000, more advantageously greater than 5000, even more advantageously greater than 6000, even more advantageously greater than 7500, and most advantageously greater than 10000.

The Fibers

The fibers of the substrate may be continuous and in the form of an assembly, which may be a preform. They may be in the form of unidirectional (UD) or multidirectional (2D, 3D) reinforcement. In particular, they may be in the form of fabrics, cloths, layers, strips or braids and may also be cut, for example in the form of nonwovens (mats) or in the form of felts.

The fibers of the substrate have a diameter between 0.005 µm and 100 µm, preferably between 1 µm and 50 µm, more preferably between 3 µm and 30 µm, and advantageously between 5 µm and 25 µm.

The fibers of the substrate may be selected from:
mineral fibers, the latter preferably having high melting points Tm, above the application temperatures,
polymeric or polymer fibers, preferably having a melting point Tm' or in the absence of Tm', a glass transition temperature Tg', well above the application temperatures,
or mixtures of the aforementioned fibers.

More particularly, the fibers may be selected as follows:
the mineral fibers may be selected from: carbon fibers, carbon nanotube fibers, glass fibers, notably of type E, R or S2, boron fibers, ceramic fibers, notably silicon carbide fibers, boron carbide fibers, boron carbonitride fibers, silicon nitride fibers, boron nitride fibers, basalt fibers, fibers or filaments based on metals and/or metal alloys, fibers based on metal oxides such as $Al_2O_3$, metallized fibers such as metallized glass fibers and metallized carbon fibers or mixtures of the aforementioned fibers, and
the polymer or polymeric fibers, under the condition mentioned above, are selected from:
fibers of thermoplastic polymers, more particularly selected from: polyethylene terephthalate (PET), polybutylene terephthalate (PBT),
fibers of polyamides,
fibers of aramids (such as Kevlar®) and aromatic polyamides such as those corresponding to one of the formulas: PPD.T, MPD.I, PAA and PPA, where PPD and MPD are p- and m-phenylenediamine respectively, PAA denotes polyarylamides and PPA denotes polyphthalamides,
fibers of polyamide block copolymers such as polyamide/polyether, fibers of polyaryletherketones (PAEK) such as polyetheretherketone (PEEK), polyetherketoneketone (PEKK), polyetherketoneetherketoneketone (PEKEKK).

The preferred reinforcing fibers are long fibers selected from: carbon fibers including metallized ones, glass fibers including metallized ones of type E, R, S2, fibers of aramids (such as Kevlar®) or of aromatic polyamides, fibers of polyaryletherketones (PAEK) such as polyetheretherketone (PEEK), fibers of polyetherketoneketone (PEKK), fibers of polyetherketoneetherketoneketone (PEKEKK) or mixtures thereof.

The more particularly preferred fibers are selected from: glass fibers, carbon fibers, ceramic fibers and fibers of aramids (such as Kevlar®) or mixtures thereof.

Said fibers may represent levels from 40 to 70 vol %, preferably from 45 to 70 vol % and even more preferably from 50 to 65 vol % of said composite material.

The assembly of fibers may be random (mat), unidirectional (UD) or multidirectional (2D, 3D or some other). Its "weight", i.e. its weight per square meter, may range from 100 to 1000 g/m², preferably from 150 to 900 g/m² and even more preferably 200 to 700 g/m².

The Polymer Resin

The polymer resin indicated by reference 50 in the figures is injected into the molding device 1.

Here, polymer resin means a viscous liquid chemical composition comprising components comprising reactive groups. When it is injected into the molding device 1, said resin makes it possible, by impregnation of the fibrous substrate 51 and subsequent polymerization of said resin, thus forming a polymerized resin, to obtain a composite component for various applications, for example in the fields of rail transport, aeronautics, or construction and building.

The resins used are reactive resins, allowing in-situ polymerization. These resins are liquid, with a viscosity less than or equal to 10 000 mPa·s at a certain temperature less than or equal to 300° C.

Injection of a polymer resin may be carried out in single-component mode according to the first embodiment and the second embodiment, or in multi-component mode, and in particular in two-component mode according to the third embodiment.

The resin comprises a syrup comprising at least one polymer or oligomer, which may or may not be reactive, and at least one monomer or a chain extender capable of reacting with said monomer or oligomer if said polymer or oligomer is reactive. The resin also comprises at least one initiator or catalyst intended to react with the monomer or chain extender to initiate polymerization.

In particular, the polymerization of the resin may be a radical polymerization, or a polyaddition or polycondensation.

In the Case of Single-Component Injection:
By radical polymerization: the resin comprises a syrup comprising at least one polymer or oligomer, which may or may not be reactive, and at least one monomer. The resin also comprises at least one initiator intended to react with the monomer and/or polymer or oligomer, if said polymer or oligomer is reactive, to initiate polymerization.
By polyaddition or polycondensation: the resin comprises a syrup comprising at least one reactive polymer or oligomer. The resin also comprises at least one chain extender intended to react with the reactive polymer or oligomer, to initiate polymerization.

Single-component injection of resin may be employed with all three embodiments of the molding device of the invention and more advantageously with the first and second embodiments.

The resins used for single-component injection comprise:
Thermosetting polyester resins, consisting of unsaturated polyester polymers diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally styrene, but may also comprise other vinylic monomers, such as (meth)acrylic monomers, whether or not in combination with styrene.
Thermosetting vinyl-ester resins, consisting of methacrylated epoxy polymers diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally styrene, but may also comprise other vinylic monomers, such as (meth)acrylic monomers whether or not in combination with styrene.
Thermosetting acrylic resins, consisting of (meth)acrylated urethane polymers or (meth)acrylated polyesters diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally methyl methacrylate, but may also comprise other vinylic monomers, such as styrene or (meth)acrylic monomers whether or not in combination with methyl methacrylate.

Mixtures of the three types of resins described above.

Thermoplastic acrylic resins consisting of at least one polymer and at least one monomer, and an initiator for starting the polymerization of said at least one monomer. The monomer or monomers are polymerizable by radical polymerization, polymerization being initiated by an initiator such as a peroxide for example, with or without an accelerator. The reactive monomer is generally methyl methacrylate, but may also comprise other vinylic monomers, such as (meth)acrylic monomers, whether or not in combination with methyl methacrylate.

Thermoplastic polyamide resins (PA and PAHT), such as those described in documents EP 1191050 and EP 2586585, incorporated by reference. Notably and as an example, we may mention the thermoplastic polyamide resins comprising at least one lactam monomer, such as β,β-dimethylpropiolactam, α,α-dimethylpropiolactam, amylolactam, caprolactam, capryllactam and lauryllactam.

In the Case of So-Called Two-Component Injection:

By radical polymerization: the resin comprises a component A consisting of a syrup comprising at least one polymer or oligomer, which may or may not be reactive, and at least one monomer. The resin also comprises a component B comprising at least one initiator intended to react with the monomer and/or polymer or oligomer, if said polymer or oligomer is reactive, to initiate polymerization.

By polyaddition or polycondensation: the resin comprises a component A consisting of a syrup comprising at least one reactive polymer or oligomer. The resin also comprises a component B comprising at least one chain extender intended to react with the reactive polymer or oligomer, to initiate polymerization.

Components A and B are brought into contact during injection of the polymer resin in a molding device, thus avoiding a step of storing a mixture of components A and B at low temperature.

Two-component injection of resin may be carried out with the third embodiment of the molding device of the invention.

The resins used for multi-component injection, in particular two-component injection, comprise:

Thermosetting polyester resins, consisting of unsaturated polyester polymers diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally styrene, but may also comprise other vinylic monomers, such as (meth)acrylic monomers, whether or not in combination with styrene.

Thermosetting vinyl-ester resins, consisting of methacrylated epoxy polymers diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally styrene, but may also comprise other vinylic monomers, such as (meth)acrylic monomers whether or not in combination with styrene.

Thermosetting acrylic resins, consisting of (meth)acrylated urethane polymers or (meth)acrylated polyesters diluted in one or more reactive monomers, in the presence of additives. The polymer and/or polymers and monomer and/or monomers are polymerizable by radical polymerization, polymerization being initiated by an initiator such as a peroxide for example, with or without an accelerator. The reactive monomer is generally methyl methacrylate, but may also comprise other vinylic monomers, such as styrene or (meth)acrylic monomers whether or not in combination with methyl methacrylate.

Mixtures of the three types of resins described above.

Thermosetting polyurethane resins, based on polymers or oligomers having isocyanate functions, in the presence of additives and/or diluents. Polymerization is carried out by polyaddition or polycondensation of a polyol or of a polyamine, optionally in the presence of an accelerator.

Thermosetting epoxy resins, based on polymers or oligomers having epoxy functions, in the presence of additives and/or diluents. Polymerization is carried out by polyaddition or polycondensation of a polyamine or of an anhydride, optionally in the presence of an accelerator.

Thermoplastic acrylic resins consisting of at least one polymer and at least one monomer, and an initiator for starting the polymerization of said at least one monomer. The monomer or monomers are polymerizable by radical polymerization, polymerization being initiated by an initiator such as a peroxide for example, with or without an accelerator. The reactive monomer is generally methyl methacrylate, but may also comprise other vinylic monomers, such as (meth)acrylic monomers, whether or not in combination with methyl methacrylate.

Thermoplastic polyamide resins (PA and PA-IT), such as those described in documents EP 1191050 and EP 2586585, incorporated by reference. Notably and as an example, we may mention the thermoplastic polyamide resins comprising at least one lactam monomer, such as β,β-dimethyipropiolactam, α,α-dimethylpropiolactam, amylolactam, caprolactam, capryllactam and lauryllactam.

The Composite Components

The molding device and the method described above make it possible to produce a composite component, or a structured or semistructured composite component, in particular a component that does not comprise any residual molding sprue and that can be used after mold release without any finishing treatment.

More particularly, said component is "net-shape" according to the term that is current in the molding industry, which signifies that it does not require any special machining or finishing before final use. This is connected with the specific conditions of manufacture and in particular of molding in a mold operating under vacuum and therefore without the need for a vent, which usually (when it is present) requires, on mold release, removal of the sprue formed in connection with this vent, by additional machining and finishing. This is an important difference in final structure and a significant additional advantage relative to the prior art in this field. In fact, the device is suitable for industrial manufacture of structured or semistructured composite components; notably there is a gain in productivity, no waste and defect-free mechanical components, with improved mechanical properties in consequence.

The structured or semistructured component thus obtained may be used for various final applications, in particular in the fields of automobiles, highway transport such as components for trucks, rail, maritime and aeronautical transport, photovoltaics, (thermal) solar in particular components of solar power stations, wind power, space, building and civil engineering, furniture and urban infrastructure, signaling, sports and leisure activities.

The invention claimed is:

1. A molding device (1) for the manufacture of structured or semistructured composite components comprising a polymer resin (50) and a fibrous substrate (51), wherein said molding device comprises:
   a mold (2) comprising a bottom and a lateral surface,
   a movable part (10) able to move along the lateral surface of the mold, comprising a compression surface (14) forming a cavity (7) with the bottom and lateral surface (5) of said mold (2), wherein the movable part (10) further comprises a punch (11) able to move along the lateral surface of the mold, and an injection head (20), said injection head being provided with a wall (21) defining an injection column (22) communicating with the cavity (7) by an opening (26),
   wherein the movable part (10) comprises a vacuum-drawing channel 13 or 23) opening into a chamber (42 or 25) located above the cavity and communicating with said cavity (7), said cavity (7) being formed by the compression surface (14), the lateral surface (5), and the bottom of the mold (2), wherein the vacuum-drawing channel (23) consists of a first channel that passes through the wall of the injection head (20), and opens into the chamber (25) consisting of the lower portion (25) of injection column (22), and wherein the vacuum-drawing channel (23) is also a channel for injecting polymer resin (50).

2. The molding device as claimed in claim 1, wherein the mold comprises a lower part (3) and an upper part (4) that is able to come into contact with said lower part in order to close the mold.

3. The molding device as claimed in claim 1, wherein said molding device further comprises a piston (30) comprising a lower part (32) provided with a lower surface, an upper part (33), and a recess (31), said piston being able to move along the injection column (22) between at least one first position called the open position, in which its lower surface defines, with the wall of the injection head and the opening, a lower portion of the injection column, and at least one second position in which the piston blocks the opening of the injection column.

4. The molding device as claimed in claim 1 wherein the injection head (20) further comprises a second channel (24) passing through the wall of the injection head, and allowing evacuation of the resin (50) from the column (22).

5. The molding device as claimed in claim 4 wherein, in the closed position, the piston (30) forms, at the level of its recess (31), with the wall of the injection head, first channel (23), and the second channel (24), a circuit for recirculating uninjected resin.

6. The molding device as claimed in claim 1, wherein the movable part (10) further comprises a collar (40) able to move along the lateral surface of the punch (11), between at least one first position, called the open position, in which the lower surface of the collar (40) defines, with the lateral surface of the punch, a shrinkage space (42) communicating with the cavity (7) via an opening (44), and at least one second position, called the closed position, in which the collar blocks said opening (44).

7. The molding device as claimed in claim 6, wherein the shrinkage space (42) comprises a peripheral groove (43) located in the punch (30).

8. The molding device as claimed in claim 1 wherein the vacuum-drawing channel (13) consists of a channel located in the punch and opening into the chamber (42) consisting of the shrinkage space, or into the peripheral groove (43) of said shrinkage space.

9. The molding device as claimed in claim 1 wherein the injection head (20) further comprises at least one first channel (23) passing through its wall for injecting the resin and at least one second channel (24) passing through its wall for evacuation of the resin from the injection head.

10. The molding device as claimed in claim 3 wherein the first channel (23) and the second channel (24) form, with the recess (31) of the piston and the wall (21) of the injection head, a circuit for recirculating uninjected resin.

11. The molding device as claimed in claim 1 wherein the upper part of the injection column (22) consists of a space (27) intended to be pressurized, and able to receive the upper part of the piston, said piston being hydraulic, in order to allow displacement of said piston along the injection column.

* * * * *